United States Patent Office 3,150,165
Patented Sept. 22, 1964

3,150,165
NON-CATALYTIC HYDROLYSIS OF DIESTERS OF DICARBOXYLIC ACIDS TO THE MONOESTERS
Harry Chafetz, Poughkeepsie, N.Y., assignor to Texaco Inc., New York, N.Y., a corporation of Delaware
No Drawing. Filed Feb. 23, 1962, Ser. No. 175,314
4 Claims. (Cl. 260—485)

This invention relates to a process for the preparation of monoesters of dibasic acids and more particularly to the preparation of monoesters of dibasic acids by the non-catalytic hydrolysis of diesters of dibasic acids.

The monoesters of dibasic acids are valuable intermediates in the preparation of high molecular weight dibasic acids from low molecular weight dibasic acids. One method of preparing high molecular weight dibasic acid is accomplished by reacting a low molecular weight dibasic acid with alcohol to form the corresponding diester, converting said diester to the monoester then subjecting the monoester to electrolytic oxidation followed by saponification and acidification of the resultant diester to form a dibasic acid of a high molecular weight.

In the past, the step of converting the diester in the above procedure into the monoester was accomplished by transesterification utilizing mixtures of dibasic acids and the diesters. Although the past method was successful in producing the monoester, it had the disadvantage of requiring corrosive catalyst, e.g., mineral acids.

I have discovered, and this constitutes the invention, a process whereby a monoester is formed in good yield by the non-catalytic hydrolysis of a diester. The selective hydrolysis is the result of the interaction of process conditions, ingredients, ingredient ratio and the absence of a hydrolysis catalyst. It is theorized that under the contemplated conditions of the invention hydrolysis of one of the ester groups of the diester molecule produces a degree of acidity which prevents hydrolysis of the second ester group thereby resulting in the production of the monoester.

Specifically my invention consists of contacting a diester of the formula $R^1OOC$—$R^2$—$COOR^3$, where $R^1$ and $R^3$ are the same or different $C_1$ to $C_{20}$ alkyl radicals and $R^2$ is a $C_1$ to $C_{20}$ alkylated or unalkylated polymethylene radical, with water in a mol ratio of water to ester between 0.2:1 and 5:1, at a temperature between about 100 and 300° C., under a pressure of between about 20 and 1000 p.s.i.g., for a period of from 0.5 to 20 hours. Under the preferred conditions the reactants are continuously agitated during the reaction period, preferably by mechanical mixing.

At the end of the reaction period the formed monoester of the formula ROOC—$R^2$—COOH, where $R^2$ is as heretofore defined and R is either $R^1$ or $R^3$ as previously defined, can be separated by any standard means such as by fractional distillation at atmospheric or reduced pressure. Another method of separation is selective extraction of the monoester with an aqueous caustic solution in the form of a salt and the subsequent regeneration of the monester salt by acidification, e.g., with a mineral acid.

Examples of the diester reactant contemplated herein are the dimethyl adipate, dimethyl succinate, dimethyl azelate, dimethyl sebacate, diethyl adipate, dibutyl azelate, and dipropyl sebacate. Examples of the contemplated monoester product are monomethyl adipate, monomethyl succinate, monomethyl azelate, monomethyl sebacate, monoethyl adipate, monobutyl azelate, and monopropyl sebacate.

The following example further illustrates the invention but is not to be construed as a limitation thereof.

EXAMPLE I

To a one liter stainless steel autoclave fitted with a thermometer, stirrer and heating element, dimethyl ester and water were charged. Stirring was then started and the reactor was heated to and maintained under autogenous pressure at the temperature and for the period of time indicated in Table A below. After the reactor had cooled the products were removed and fractionally distilled at reduced pressure. The detail of reactants, reaction condition and product are described below in Tables A and B:

Table A
REACTANTS AND REACTION CONDITIONS

| Run No. | Dimethyl ester | Ester, mole | Water, mole | Reaction time, hr. | Reaction temp., °C. | Final pressure, p.s.i.g. |
|---|---|---|---|---|---|---|
| 1 | Dimethyl adipate | 0.58 | 0.61 | 5 | 193–202 | 65 |
| 2 | ----do---- | 0.58 | 1.2 | 4.5 | 160–202 | 125 |
| 3 | Dimethyl succinate | 0.83 | 1.4 | 5 | 143–199 | 115 |

Table B
PRODUCT AND PRODUCT YIELD

| Run No. | Product | Mole percent yield* | Distillation cut,°C./mm. Hg | Refractive Index, $n_D^{20}$ |
|---|---|---|---|---|
| 1 | Monomethyl adipate | 28 | 167–173/18 | 1.4412. |
| 2 | ----do---- | 38 | 165–173/18 | 1.4411. |
| 3 | Monomethyl succinate | 37 | 145–148/18 | Neut. No. 431. |

\* Basis dimethyl ester charged.

In the above described runs the production of dibasic acids was not detected indicating that under the process conditions the hydrolysis of the diester molecule apparently ceases upon the hydrolysis of one of the ester groups therein.

I claim:
1. A non-catalytic method of preparing a monoester of the formula ROOC—$R^1$—COOH where R is a lower alkyl radical and $R^1$ is a $C_1$ to $C_{20}$ alkylene radical consisting essentially of contacting a diester of the formula ROOC—$R^1$—COOR, where R and $R^1$ are as heretofore defined, with water in a mole ratio of water to diester of between about 0.2:1 and 5:1, at a temperature between about 100 and 300° C. under a pressure of between about 20 and 1000 p.s.i.g. and separating said monoester from the final reaction mixture.

2. A method in accordance with claim 1 wherein said diester is dimethyl succinate and said monoester is monomethyl succinate.

3. A method in accordance with claim 1 wherein said diester is dimethyl adipate and said monoester is monomethyl adipate.

4. A method in accordance with claim 1 wherein said separating is accomplished by fractional distillation under reduced pressure.

References Cited in the file of this patent

Newitt et al.: Chemical Society Journal (London), Pt. 1 January–June 1937, pages 876–883.

Groggins: Processes in Organic Synthesis, 4th edition, McGraw-Hill Book Company, Inc. New York (1952) pages 675–676.